United States Patent [19]
Lee et al.

[11] Patent Number: 5,905,561
[45] Date of Patent: *May 18, 1999

[54] ANNULAR MASK LENS HAVING DIFFRACTION REDUCING EDGES

[75] Inventors: Chun-Shen Lee, Cupertino; Jerome A. Legerton, Los Gatos; John M. Evans, Fremont; Praful C. Doshi, Poway, all of Calif.

[73] Assignee: PBH, Inc., Des Plaines, Ill.

[*] Notice: This patent is subject to a terminal disclaimer.

[21] Appl. No.: 08/663,907

[22] Filed: Jun. 14, 1996

[51] Int. Cl.⁶ .............................. G02C 7/04; G02C 7/10; A61F 2/16

[52] U.S. Cl. .................... 351/162; 351/160 R; 351/163; 623/6

[58] Field of Search ................................. 351/162, 163, 351/160 R, 160 H, 161; 623/6

[56] References Cited

U.S. PATENT DOCUMENTS

| | | | |
|---|---|---|---|
| 3,794,414 | 2/1974 | Wesley | 351/161 |
| 3,946,982 | 3/1976 | Calkins et al. | 249/102 |
| 4,576,453 | 3/1986 | Borowsky | 351/162 |
| 4,702,574 | 10/1987 | Bawa | 351/162 |
| 4,955,904 | 9/1990 | Atebara et al. | 623/6 |
| 4,994,080 | 2/1991 | Shepard | 623/5 |
| 5,089,024 | 2/1992 | Christie et al. | 623/6 |
| 5,108,169 | 4/1992 | Mandell | 351/161 |
| 5,245,367 | 9/1993 | Miller et al. | 351/161 |
| 5,260,727 | 11/1993 | Oksman et al. | 351/162 |
| 5,414,477 | 5/1995 | Jahnke | 351/162 |
| 5,434,630 | 7/1995 | Bransome | 351/162 |
| 5,662,706 | 9/1997 | Legerton et al. | 623/6 |

FOREIGN PATENT DOCUMENTS

| | | |
|---|---|---|
| 241 830 | 12/1992 | Argentina . |
| 244 890 | 11/1993 | Argentina . |
| 0 225 098 | 6/1987 | European Pat. Off. . |
| 1115140 | 4/1956 | France . |
| 1400566 | 4/1965 | France . |
| 2599-156 | 5/1986 | France . |
| 3-1857 | 1/1991 | Japan . |
| 1276003 | 6/1972 | United Kingdom . |
| WO 94/23327 | 10/1994 | WIPO . |

OTHER PUBLICATIONS

Bailey, O.D., Ph.D., *Special Contact Lenses and Their Applications*, pp. 32–33, Optical Journal–Review, Jan. 1, 1960.

Bier, *Prescribing for Presbyopia with Contact Lenses*, The Ophthalmic Optician, 5(9):439–455 (1965).

Contact Lens Practice, pp. 394–398, 644–646, 655–656.

Groppi, *New Aspects in the Fitting of the Multi–Range Bifocal Contact Lens*, Contacto, 15(2):22–29 (1971).

Mazow, *The Pupilens—A Preliminary Report*, International Contact Lens Congress in Munich, Aug. (1958).

Neefe, *Neefe Special Contact Lenses*, Contacto, Nov. (1975) pp. 301–303.

Rosenbloom, *The Controlled–Pupil Contact Lens in Low Vision Problems*, Journal of the American Optometric Association 40(8):836–840 (1969).

Wesley, *A New Concept in Successful Bifocal Contact Lens Fitting*, pp. 71–73.

*Primary Examiner*—Georgia Epps
*Assistant Examiner*—Jordan M. Schwartz
*Attorney, Agent, or Firm*—Burns, Doane, Swecker & Mathis, L.L.P.

[57] ABSTRACT

Annular mask lens for vision correction having diffraction-reducing edges. The lens body having an annular mask that forms a "soft edge" by gradually decreasing the transmissivity radially from the center aperture to the annular mask area.

4 Claims, 11 Drawing Sheets

ANNULAR MASK LENS HAVING DIFFRACTION REDUCING EDGES

FIELD OF THE INVENTION

This invention concerns a lens for vision correction and, in particular, masked lenses and related methodology.

BACKGROUND OF THE INVENTION

Contact lenses are commonplace today. Most individuals with average refractive errors can quickly and easily acquire and use these lenses in place of prescription eye glasses. This is not true, however, for individuals who are presbyopic (i.e., those requiring multi-focal visual correction) or for those individuals with structural eye abnormalities. These individuals are left with little choice in selecting comfortable, effective contact lenses. Lenses which are available typically encumber these wearers with other difficulties, and are usually very expensive. Presbyopic individuals, for example, who choose to wear soft contact lenses are usually fitted in a "monovision" mode, where one eye is corrected for near vision, and the other eye is corrected for far vision. Notwithstanding the availability of such multifocal lenses, such lenses are not versatile in supplying simultaneous clear distance/near vision and are not commercially successful.

The long felt need to develop more versatile multifocal lenses has led designers to "pinhole" contact lenses (e.g., PCT Publication No. W095/08135 published Mar. 23, 1995). These lenses endeavor to utilize the known theories of pinhole imaging as a method to reduce or eliminate visual deficiencies. An annular mask with a clear center aperture of various sizes (conventionally up to 4 millimeters in diameter) is used to increase the depth of focus of presbyopic individuals. Unfortunately, the utility of this technology has been diluted because of designs and approaches inappropriate for effective corrective refractive prescriptions. For upwards of 50 years, pinhole contact lenses have been under consideration, yet they remain today commercially unsuccessful and largely unavailable. One of the principle reasons conventional pinhole contact lenses have been ineffective is that they suffer from diffraction effects at the sharp demarcation where the pinhole aperture stops and the opaque mask surrounding the aperture begins.

"Multiple Focal Contact Lenses", as described in U.S. Pat. No. 3,794,414, was one attempt to develop small-aperture contact lenses. This approach combined a pinhole-like aperture with radial slits and scalloped masking regions on a contact lens supposedly to correct both peripheral vision and the effects related to decentered contact lenses. The masked contact lenses were made from a rigid substrate, and "floated" on the eye, creating a need for apertures over a large portion of the lens. The disclosed designs though (i.e., the use of scalloped patterns and radial slits) actually encourage diffraction effects at the retina. This reduces image quality. The purpose of pinhole aperture correction is to correct geometrical aberrations in excess of diffraction. Therefore, the benefits achieved according to that patent by incorporating the pinhole aperture, are likely to be offset by undesirable diffraction effects.

Pinhole correction together with the normal functioning of the human pupil is considered in U.S. Pat. No. 4,955,904, which presents a masked intraocular lens surgically implanted within the eye. The patent, entitled "Masked Intraocular Lens and Method for Treating a Wearer With Cataracts", affords cataract wearers some form of vision correction through surgery. The intraocular lens is masked to form a pinhole that accommodates the function of the human pupil under different lighting conditions. However, the intraocular lens of that patent is also likely to be offset by undesirable diffraction effects created by the sharp demarcation at the junction of the pinhole and the opaque mask. U.S. Pat. No. 5,245,367 issued to Miller et al. discloses an annular mask contact lens wherein the optical opacity of the mask region can vary within the lens.

SUMMARY OF THE INVENTION

The present invention provides, in one aspect, a novel lens having an annular mask which mask eliminates the sharp demarcation at the edge of the conventional pinhole aperture. The lens body has a mask that forms a "soft edge" by gradually decreasing the transmissivity radially from the center aperture to the masked area.

In a further aspect according to the invention, the invention reduces or eliminates the "halo effect" by eliminating or reducing diffraction around the outer edge of the mask by eliminating the sharp demarcation at the outer edge of the mask. The lens body has a mask that gradually increases the transmissivity radially again toward the outer edge of the mask.

The advantages of a lens constructed in accordance with the invention are several. The lens improves a wearer's vision over a wide range of viewing distances. The lens reduces and/or eliminates diffraction effects associated with a conventional pinhole lens. The lens improves a wearer's vision during differing brightness conditions by incorporating the normal function of the human pupil into the transmissivity of the annular mask. Moreover, in a preferred embodiment, complex vision correction is possible with the invention by providing a multi-powered lens.

BRIEF DESCRIPTION OF THE DRAWINGS

For a fuller understanding of the nature and objects of the invention, reference should be made to the following detailed description and the accompanying drawings, in which.

DESCRIPTION OF THE PREFERRED EMBODIMENTS

The present invention will now be described with respect to a contact lens, but as will be appreciated by one of ordinary skill in the art, the principles of the present invention can be incorporated into any vision correcting lens, including but not limited to contact lenses (including rigid or hard lenses, hybrid lenses, hydrogel lenses and gel lenses that do or do not contain water), intraocular lenses, intracorneal lenses, anterior chamber lenses, etc. which are all encompassed by the invention.

Figure 1:
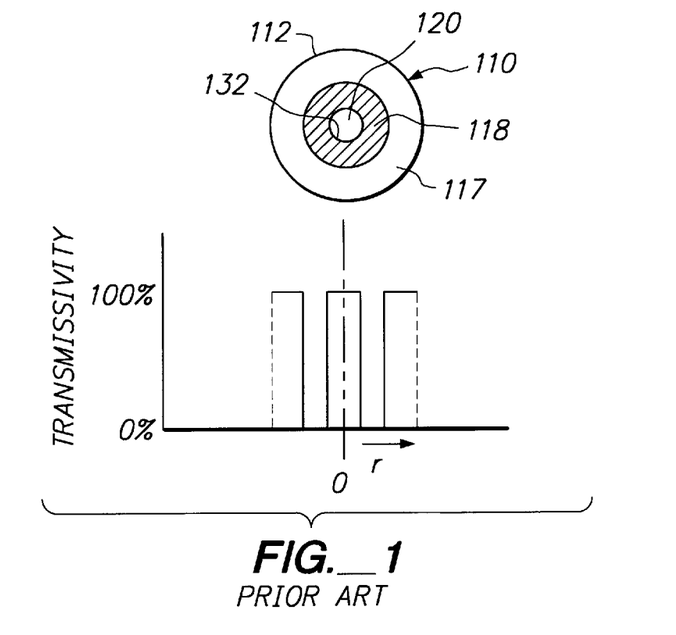
FIG. 1 is a plan view of an annular mask contact lens constructed in accordance with the prior art.
Figure 2:
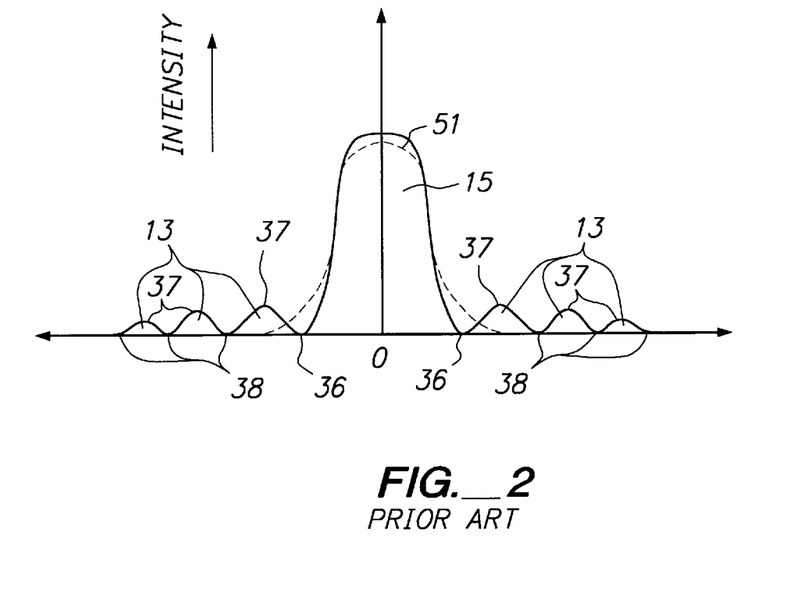
FIG. 2 illustrates the point spread function of a point object imaged through a circular aperture.

The annular mask 118 used in a conventional pinhole contact lens 110 (FIG. 1) for presbyopic individuals has a sharp demarcation at the edge 132 of the clear central aperture 120. The graph in FIG. 1 illustrates that the lens body 112 has a transmissivity of 100% in the aperture 120 and in the annular region 117, and no light transmission through the opaque annular mask 118. It is known that the point spread function of a point object imaged through an optical system having a circular aperture (like a conventional pinhole contact lens) has a bright central area known as an Airy Disk 15 and several annuli lobes 13 of lower brightness as depicted in FIG. 2. The intensity is at a maximum at the center of the Airy Disk 15 and decreases to a first dark ring 36. The intensity then increases and decreases infinitely radially outward with exponentially smaller and smaller peaks in the lobes 13. These cycles form several annuli peaks 37 and dark rings 38. The angular radius of the first dark ring 36 at the edge of the Airy Disk 15 is defined by the wavelength of the light and the diameter of the circular aperture that the object is being imaged through. The maximum spatial frequency of an object that can be resolved by an optical system having a circular aperture is limited by the size of the Airy Disk 15 of the point spread function. In a contact lens, the maximum spatial frequency 25 that is resolved is related to the visual acuity. The "side-lobes" or annuli lobes 13 of the point spread function will generally reduce the contrast (i.e., the modulation transfer function) of the image making it more difficult to discern detail. It is known that the "side-lobe" annuli 13 result from the diffraction of light as it passes the sharp edge 132 (i.e., abrupt demarcation) of the aperture 120. Therefore, eliminating or reducing the abrupt change eliminates or reduces the intensity of the "side-lobe" annuli which enhances the contrast of the image.

In its simplest form, the present invention utilizes a "soft edge" at the junction of the clear aperture and the annular mask. In one embodiment, this is accomplished by reducing the transmittance of the central aperture as a function of increasing radial position. In another embodiment, this is accomplished by decreasing the transmissivity of the annular mask as a function of increasing radial position. In yet another embodiment, this is accomplished by varying the transmittance in an annular portion between the aperture and the annular mask.

Figures 3, 4:
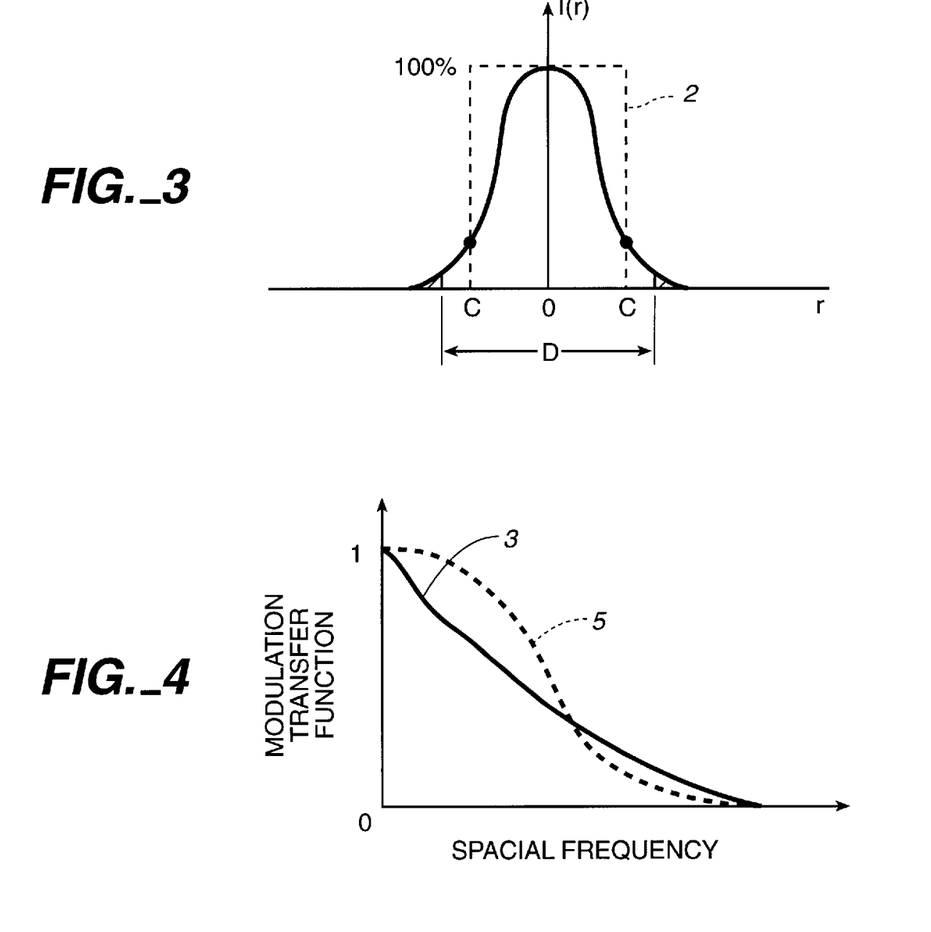
FIG. 3 illustrates the transmittance of a Gaussian apodized aperture in accordance with one embodiment of the present invention.
FIG. 4 is a comparison of the perfect lens modulation transfer function of a uniform aperture and the modulation transfer function of a truncated Gaussian apodized aperture with respect to spatial frequency.
Figure 8:
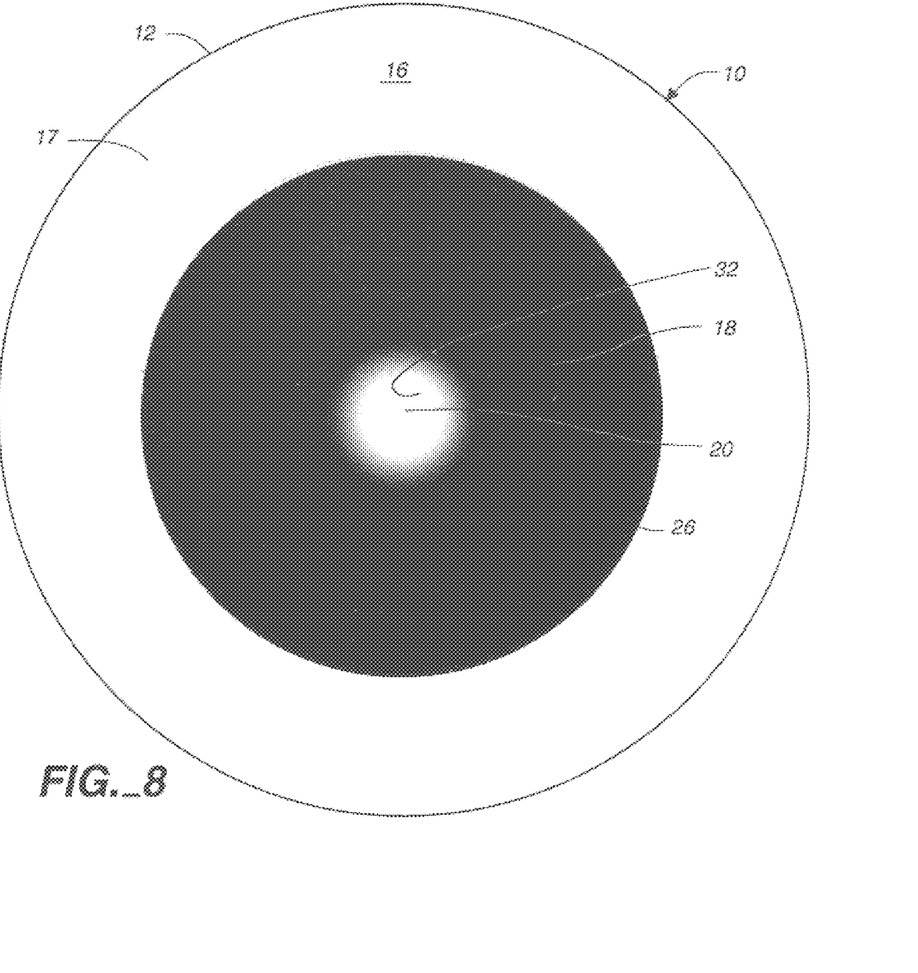
FIG. 8 is a photograph of an annular mask in accordance with one embodiment of the present invention with the perimeter of the lens shown by a solid line.

In one embodiment, the present invention eliminates the sharp edge (i.e., abrupt demarcation) by apodizing the aperture. Apodization is the process of changing the energy distribution of the point spread function by deliberate manipulation of the aperture function so as to improve image quality. In other words, the characteristics of the aperture are changed to improve the contrast. The present invention utilizes amplitude apodization such that the amplitude transmittance aperture function varies from the center to the edge of the aperture. FIG. 3 graphically illustrates this embodiment. The transmittance starts at 100% at the center of the lens and decreases as the radial position on the lens increases into the annular mask region. The transmittance function of the aperture 20 of lens 10 (FIG. 8) is, in one embodiment, a Gaussian apodized aperture described by the function:

$$I(r)=e^{-(r/c)^2}$$

where I(r) is the transmissivity amplitude for the aperture 20 as a function of the radial position, r, and c is the effective radius of the aperture (FIG. 3). For the Gaussian curve defined by the above equation when the transmissivity is 36.8% then the distance to that point defines the effective radius. The effective radius is chosen from the range of radii of a conventional pinhole contact lens (typically about 0.25 to about 1.5 millimeters) so that the total energy transmitted through the apodized aperture is approximately equal to the total energy transmitted through a conventional pinhole aperture having a radius equal to the effective radius. Preferably, c is 0.7 millimeters. Curve 2 represents the transmissivity of a conventional pinhole contact lens. One advantage of the Gaussian apodized aperture is that it suppresses or even completely eliminates all of the side-lobe annuli 13 depending on the truncated width, D, of the Gaussian profile. The larger the truncated width, the greater the suppression of the side-lobe annuli. The truncated width is the point at which the annular mask 15 (FIG. 8) begins to function effectively as opaque. Preferably, at a transmissivity of about 1% or less the annular mask is opaque.

There are two significant effects on the point spread function as a result of Gaussian apodization. First, the side-lobe annuli of the point spread function are greatly suppressed or eliminated compared to a uniform (or unapodized) conventional pinhole aperture, thus improving visual acuity. Second, the width of the point spread function 51 (FIG. 2) for a truncated Gaussian apodization is broader than that for a uniform aperture (i.e, Airy Disk) when the truncated width of the Gaussian apodization is at the effective width of the Gaussian profile and equal to the width of the uniform aperture. FIG. 4 illustrates this effect by comparing the perfect lens modulation transfer function curve 3 (or contrast) of a uniform aperture to the modulation transfer function curve 5 of a truncated Gaussian apodized aperture. As can be seen, the contrast at low spatial frequencies for the truncated Gaussian apodized aperture is enhanced and suppressed at high spatial frequencies. However, the contrast at the high spatial frequencies for the truncated Gaussian apodized aperture can be increased by truncating the Gaussian apodized profile at a larger width.

Figure 5:
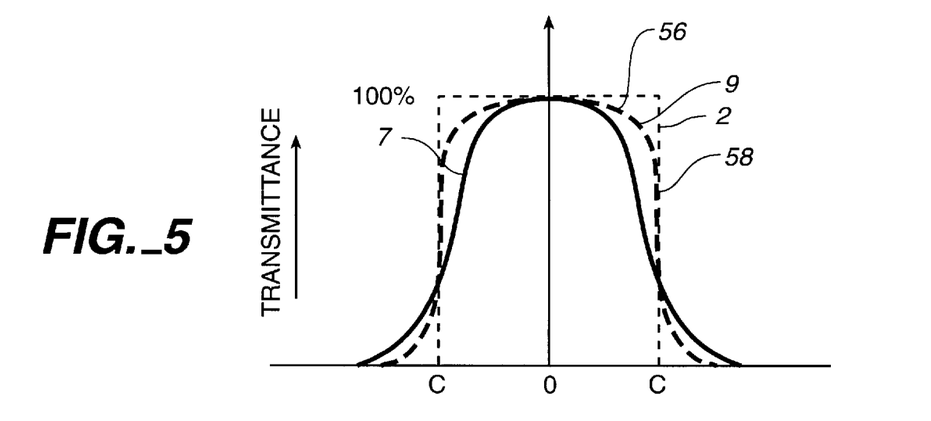
FIG. 5 is a comparison of the transmittance of a uniform aperture, Gaussian apodized aperture and pseudo-Gaussian apodized aperture.
Figure 6:
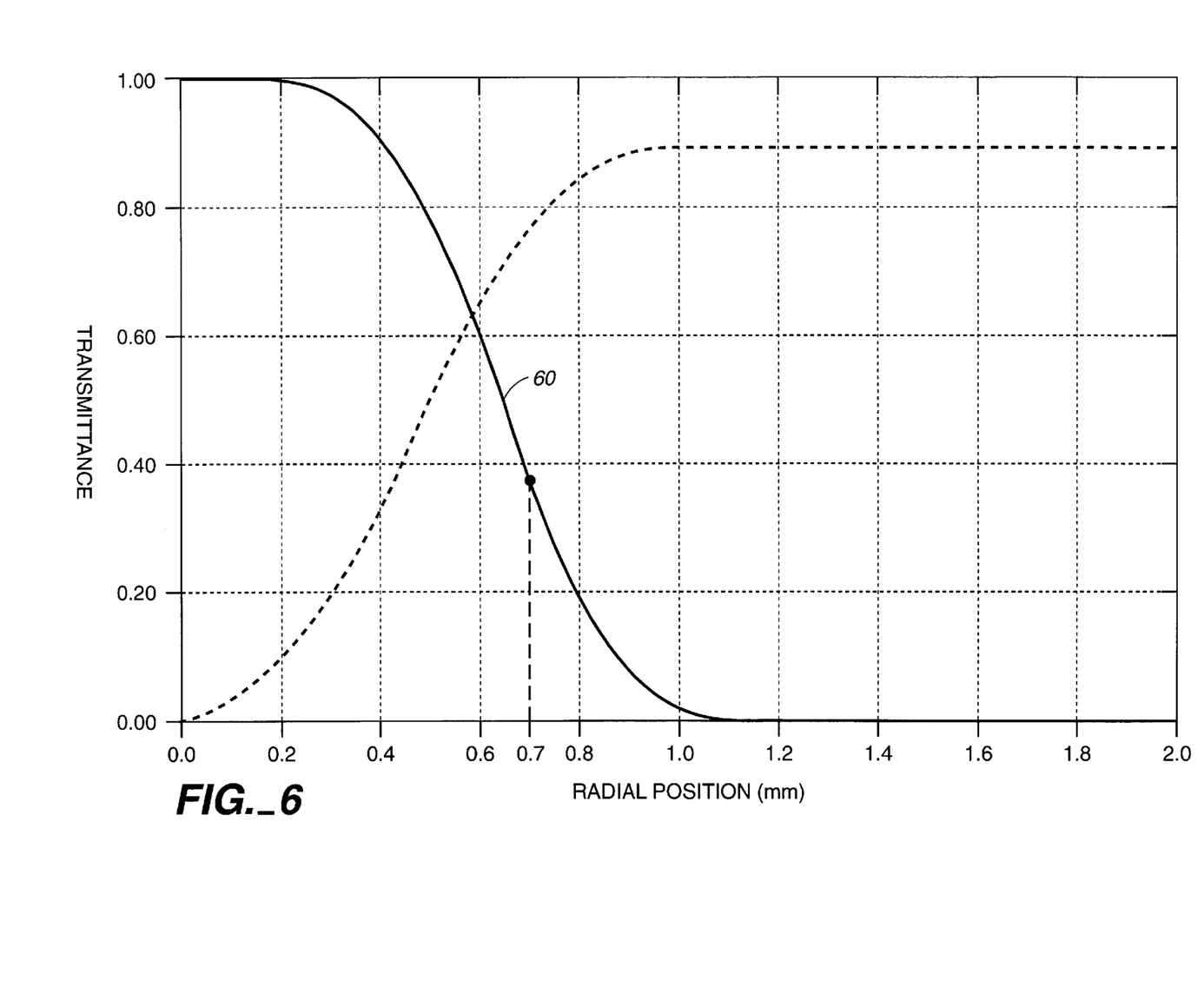
FIG. 6 is a graph of transmittance versus radial position for a pseudo-Gaussian apodized aperture in accordance with one embodiment of the present invention.
Figure 7:
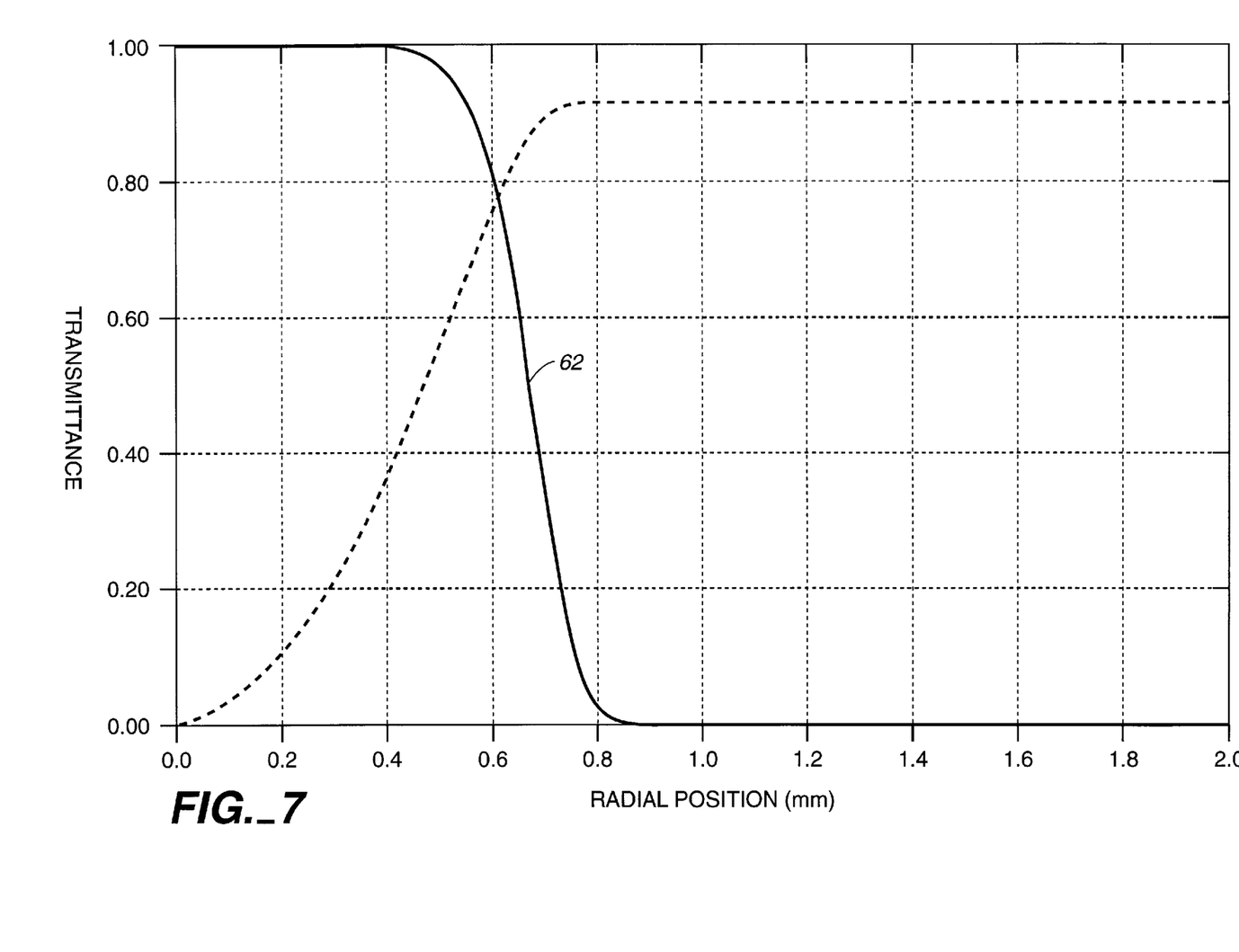
FIG. 7 is a graph of transmittance versus radial position for a pseudo-Gaussian apodized aperture in accordance with one embodiment of the present invention.

Based on the principle discussed above, in one embodiment the present invention is a lens with pseudo-Gaussian apodized (or tapered) amplitude transmittance varying toward the edge of the aperture. The apodized aperture function is a pseudo-Gaussian profile 9 (FIG. 5) given by the equation:

$$I(r)=e^{-(r/c)^x}$$

where I(r), r, and c are defined above and 2<x<10. The function is referred to as Gaussian when x=2 and as pseudo-Gaussian for values greater than 2. FIGS. 5–7 illustrate the effects of different values of x for the pseudo-Gaussian profile. For each of these figures, c equals 0.7 millimeters. The effective radius is chosen from the range of radii of a conventional pinhole contact lens, as discussed above, which is typically in the range of about 0.25 to 1.5 millimeters. In FIG. 5, profile 7 represents x=2 and profile 9 represents x=4. As can be seen in FIG. 5, increasing values of x produce a profile that is flatter in region 56 and steeper in region 58 than the Gaussian profile.

FIGS. 6 and 7 demonstrate the effects of pseudo-Gaussian profiles having different values for x. In FIG. 6, x equals 4 resulting in pseudo-Gaussian profile 60. In profile 60, the transmissivity is 100% until about 0.15 millimeters then gradually decreases to 20% transmissivity by about 0.79 millimeters and to 0% transmissivity by about 1.1 millimeters. In FIG. 7, x equals 10 resulting in pseudo-Gaussian profile 62. In profile 62, the transmissivity remains at 100% until about 0.4 millimeters, then steeply decreases to 20% transmissivity by about 0.75 millimeters and to 0% transmissivity by about 0.81 millimeters. The steep slope of profile 62 more closely simulates a conventional pinhole aperture without having the attendant diffraction problems. To provide for a multifocal effect, x is selected to provide minimal diffraction for a given patient relative to that patient's visual characteristics at the time of fitting, such is within the skill in the art.

When x approaches very large numbers, the pseudo-Gaussian apodized aperture becomes essentially a uniform aperture.

To this point, the apodization has been described as a Gaussian or pseudo-Gaussian function. However, the present invention is not limited to a Gaussian or pseudo-Gaussian function to produce the "soft edge" effect. Any number of functions can be used, such as but not limited to linear, exponential, parabolic, any combination of these, etc. In addition, the present invention is not limited to "soft edges" that are defined by a mathematical function. It is within the scope of the invention that the "soft edge" in a lens having either a decreasing transmissivity aperture or a clear aperture (as described later) be defined as any decreasing transmissivity that essentially begins at about 100% and decreases to about 20% or less within a distance in the range of about 0.05 millimeters or greater to about 1.0 millimeters or less, more preferably, decreases to about 10% or less within that distance, more preferably, decreases to about 1% or less within that distance. Likewise, more preferably decreases to about 20% or less within a distance in the range of about 0.1 millimeters or greater to about 1.0 millimeters or less, more preferably decreases to about 10% or less in that distance, more preferably decreases to about 1% or less in that distance. Likewise, more preferably decreases to about 20% or less within a distance in the range of about 0.15 millimeters or greater to about 0.4 millimeters or less, more preferably decreases to about 10% or less in that distance, more preferably decreases to about 1% or less in that distance. In some of these embodiments, the "soft edge" surrounds a clear aperture of a defined diameter in the range of about 1.0 to 2.0 millimeters, more preferably about 1.5 millimeters. The "soft edge" in some embodiments is an annular portion between the aperture and an annular mask.

In accordance with the present invention, the lens body 12 has a first surface (not shown) optically configured (e.g., with a concave form) to conform to the eye curvature of the wearer. The lens body 12 has a second surface 16 optically configured (e.g., with a convex form) to correct the vision of the wearer selectively at a focus between and including far and near objects. Focusing is achieved both by the lens 10 and by the refractive capability of the wearer's eye.

The invention is not limited to the embodiment of a decreasing transmissivity aperture, a clear aperture with a decreasing transmissivity annular mask is also within the scope of the invention. The contact lens 10 in one embodiment of the present invention (FIG. 8) has an annular mask 18 that is selectively transmissive along its inner edge (i.e., annular portion) 32 according to the principles discussed above to eliminate the sharp demarcation between the aperture 20 and the annular mask 18. The selective transmissivity along the inner edge 32 is achieved by starting with about 100% transmissivity at the junction with the aperture 20 and reducing the transmissivity radially outward until the aperture functions essentially like a pinhole aperture (i.e., opaque) even though there is no sharp demarcation at the transition from the clear aperture to the opaque mask. Preferably, in one embodiment, the mask is opaque at a transmissivity of about 1% or less. Preferably, the point at which the aperture functions essentially like a pinhole aperture is reached at a radial position of about 0.6 to 1.0 millimeters, more preferably about 0.6 to 0.8 millimeters, and most preferably at 0.7 millimeters. The transmissivity can continue to decrease beyond the point at which the aperture functions essentially like a pinhole aperture until the mask becomes opaque or the transmissivity can change quickly to essentially opaque or opaque for the remainder of the width of the mask such that it blocks light energy at the lens body 12. In this way, the annular mask 18 forms an essentially pinhole-like aperture 20 at the wearer's optical line-of-sight without diffraction effects generated by an abrupt edge. The variably transmissive aperture 20 is preferably arranged to be concentric with the wearer's line of sight, which could be off-center with respect to the geometric center of the lens.

Constructed in this fashion, the contact lens 10 operates similar to a pinhole imager and increases the depth of focus for objects viewed by the wearer. Normally, the typical geometrical vision deficiencies encountered in wearers, like myopia, hyperopia, astigmatism, and presbyopia, spread out the light rays reaching the retina from a single object point in the field of view, thereby reducing image contrast. The variably transmissive aperture 20 limits these light rays to a small bundle entering the eye pupil, and thereby improves image contrast. The present invention has the further advantage over a conventional pinhole lens in that the "soft edge" reduces or eliminates diffraction, thus producing better visual acuity.

The variably transmissive aperture 20 is sized to provide pinhole-like imaging improvement for the wearer's vision deficiency. The variably transmissive aperture 20 is smaller than the wearer's pupil size during average lighting conditions to improve vision clarity during such conditions. Preferably, however, the variably transmissive aperture 20 is smaller—or approximately equivalent to—the pupil of the wearer during bright light conditions. With this latter sizing, the wearer has improved vision clarity even during bright light conditions. The diameter of the variably transmissive aperture 20 is generally about 1 millimeter or greater and 2 millimeters or less. In a preferred embodiment, the variably transmissive aperture 20 is approximately 1.5 millimeters in diameter. Since the contact lens may not always center over the wearer's pupil, the lens 10 is preferably fitted first, and the position of the pupil noted, and the lens 10 is then made to special order according to the fitting so the annulus 18 centers over the wearer's pupil. Alternatively, the lens 10 can be mass-produced to meet a generalized population of wearer's or to meet a series of sets of wearer's requirements. In a preferred embodiment, the lens body 12 is weighted (e.g., with a prism ballast) or shaped to center the variably transmissive aperture 20 at the optimal location on the eye of the wearer, and to reduce the movement of the contact 10 on the wearer's eye, preferably to less than approximately one and one-half millimeters. Accordingly, the lens 10 is held in a relatively constant position on the eye of the wearer, thereby maximizing the lens 10 for central vision while reducing the possibility of a reduction in the peripheral field by decentering and other excessive movements.

In addition, the effective radius of the annular mask 18, from the soft edge 32 to the outside edge 26, is preferably approximately 0.95 millimeters or greater and 4.4 millimeters or less. This dimension is sized in the practice of the invention to accommodate the normal function of the human pupil.

The lens body 12 can be constructed with material to form a hard, gas permeable lens, or, alternatively, to form a soft contact lens (e.g., with a flexible soft polymer material). Combinations of these materials are also suitable to form a composite contact. The outer diameter of the lens body 12 is approximately seven to eighteen millimeters, depending upon the wearer's eye size. It can be appreciated that the dimensions of the annular mask 18 can be adjusted for a particular wearer. For example, the annular mask 18 can be sized for a particular pupil, or further optimized for a desired visual correction.

For ease of manufacture, in one embodiment the surface 16 away from the wearer's eye is appropriately configured and powered to correct the vision of the wearer for intermediate objects approximately midway between near and far objects. The contact lens 10 typically corrects the wearer's vision by forming an optical correction on the surface 16. Common corrections include convex, concave, toric, and astigmatic forms. Alternatively, or in conjunction with an optical correction on the surface 16, the surface in contact with the wearer's eye can similarly include an optical correction, such as a toric, astigmatic, or concave form. In a preferred embodiment, the portion of the surface 16 located in the variably transmissive aperture 20 is configured to correct the wearer's vision at an intermediate focus, and the portion of surface 16 located within the region 17 corrects the wearer's vision for far objects to provide a multi-powered lens. It should be apparent to those skilled in the art that other multi-powered corrections are possible without departing from the scope of the invention.

In one embodiment, the outer diameter of the annular mask 18 is sized to be smaller than a wearer's dilated pupil during lower light conditions. During lower light conditions, the wearer can thus receive light rays at the retina through the transmitting region 17. Accordingly, the contact lens 10 increasingly transmits more light rays as the wearer's pupil size increases or dilates. The wearer is, therefore, better able to discern the same objects which were viewed under brighter conditions.

Figure 9:
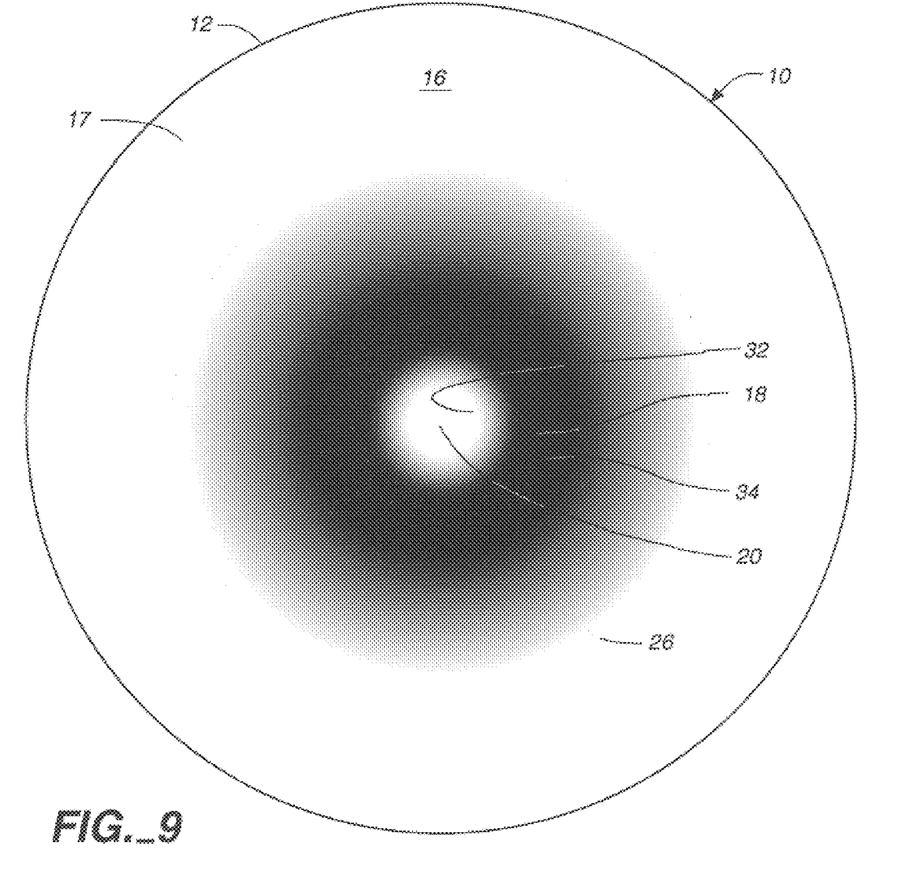
FIG. 9 is photograph of an annular mask in accordance with another embodiment of the present invention with the perimeter of the lens shown by a solid line.
Figure 10:
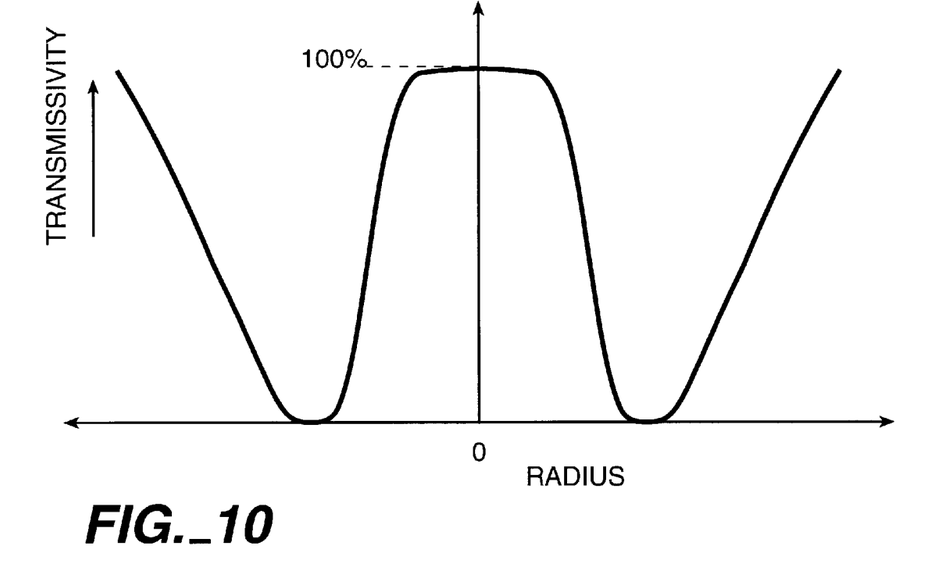
FIG. 10 is a graph of transmittance versus radial position for the annular mask of FIG. 9.

In another embodiment (FIG. 9), the mask region 18 whether in the form of a coating or other structure, can have various selected levels of transmissivity. Opacity in the annular mask is generally desired for maximum visual sharpness. However, some wearers may want or need more light energy transmitted through the annular mask region 18 to avoid a sense of visual dimness or energy starvation (i.e., to attain more brightness) in medium to low light conditions. For example, the lens 10 (FIG. 9) transmits less light energy towards the central portion 34 of the mask region 18 but still more than at the point of least transmissivity in the mask region and transmits relatively more light energy towards the outer edge 26 of the mask region than at the central portion 34 of the mask region 18. In one embodiment, the transmissivity transition for the annular mask 18 from less light energy to more light energy utilizes the Gaussian and/or pseudo-Gaussian principles discussed above to eliminate any sharp demarcation between the outer edge 26 and the clear region 17 to avoid adverse diffraction effects. As with the "soft edge" 32, the transmissivity in the annular mask region can follow any mathematical function or not be defined by a mathematical function. FIG. 10 illustrates the transmissivity for one embodiment of the lens of FIG. 9. The transmissivity at the center of the lens starts at 100% then decreases according to the principles above until reaching a transmissivity below which the mask is opaque or performs as essentially opaque. Preferably, the transmissivity stays at that level for a width of between about 0.5 millimeters to 4.0 millimeters, preferably about 1.5 to 2.0 millimeters, to take full advantage of the benefits of the pinhole effect, then increases in transmissivity to the outer "soft edge" 26 or to the edge of the lens. Preferably, the transition in "soft edge" 32 is more rapid than the transition in the annular mask to its outer portion.

Figure 11:
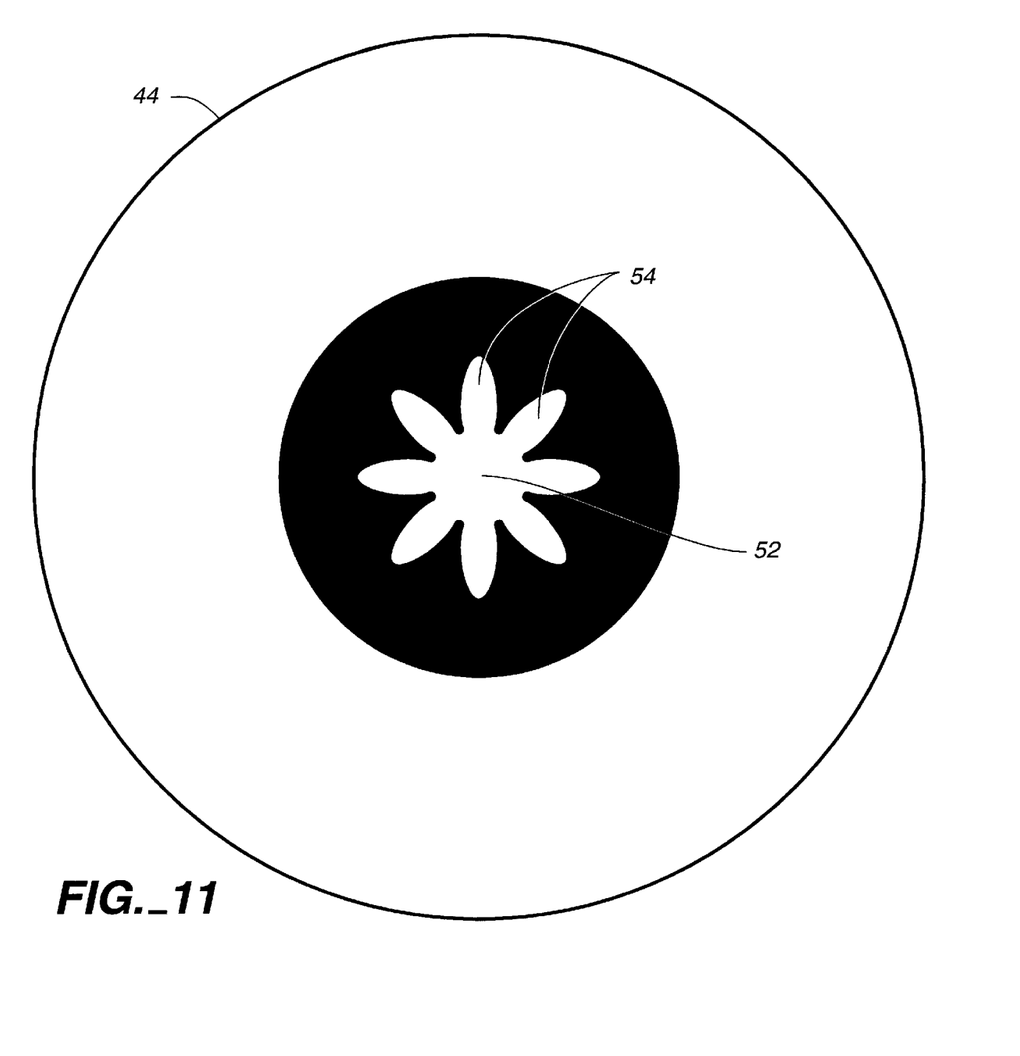
FIG. 11 is one embodiment of a mask pattern used to produce the annular mask of FIG. 8.
Figure 12:
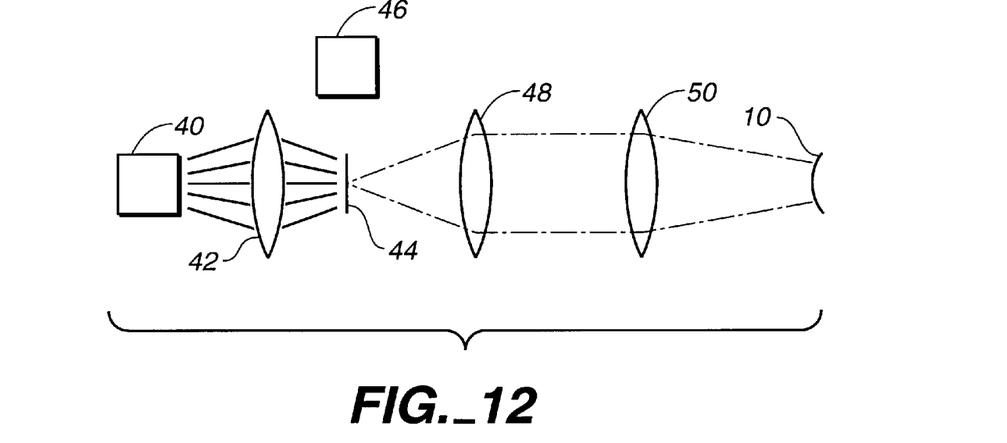
FIG. 12 is a diagrammatic representation of an apparatus used to produce the annular mask of FIG. 8.

Those skilled in the art will appreciate that the mask regions of the lens can be constructed in several ways. In one embodiment, an opaque spinning mask 44 (FIG. 11) is used to produce an annular mask like the one shown in FIG. 8. The apparatus used with the spinning mask 44 is shown diagrammatically in FIG. 12. The method as described with respect to FIGS. 11 and 12, can be used to produce a variably transmissive annular mask of any desirable profile depending on the pattern of the spinning mask used. A light source 40 and condenser lens 42 provide back illumination to mask 44 which is spun by motor 46. The spinning mask 44 as an object is imaged through relay lens 48 and imaging lens 50 onto the lens 10 using a photo-reactive dye or coating in or on the lens. The opaque mask 44 has a central light transmitting region 52 and several light transmitting "petals" 54 extending radially outward from the region 52. The profile of the variably transmissive annular mask on the resulting lens is controlled by changing the shape of the design of the "petals". As the mask is spinning about an axis symmetric to the petal pattern, the image of the spinning mask becomes an apodized pattern on the lens with continuously variable gray tones.

Figure 13:
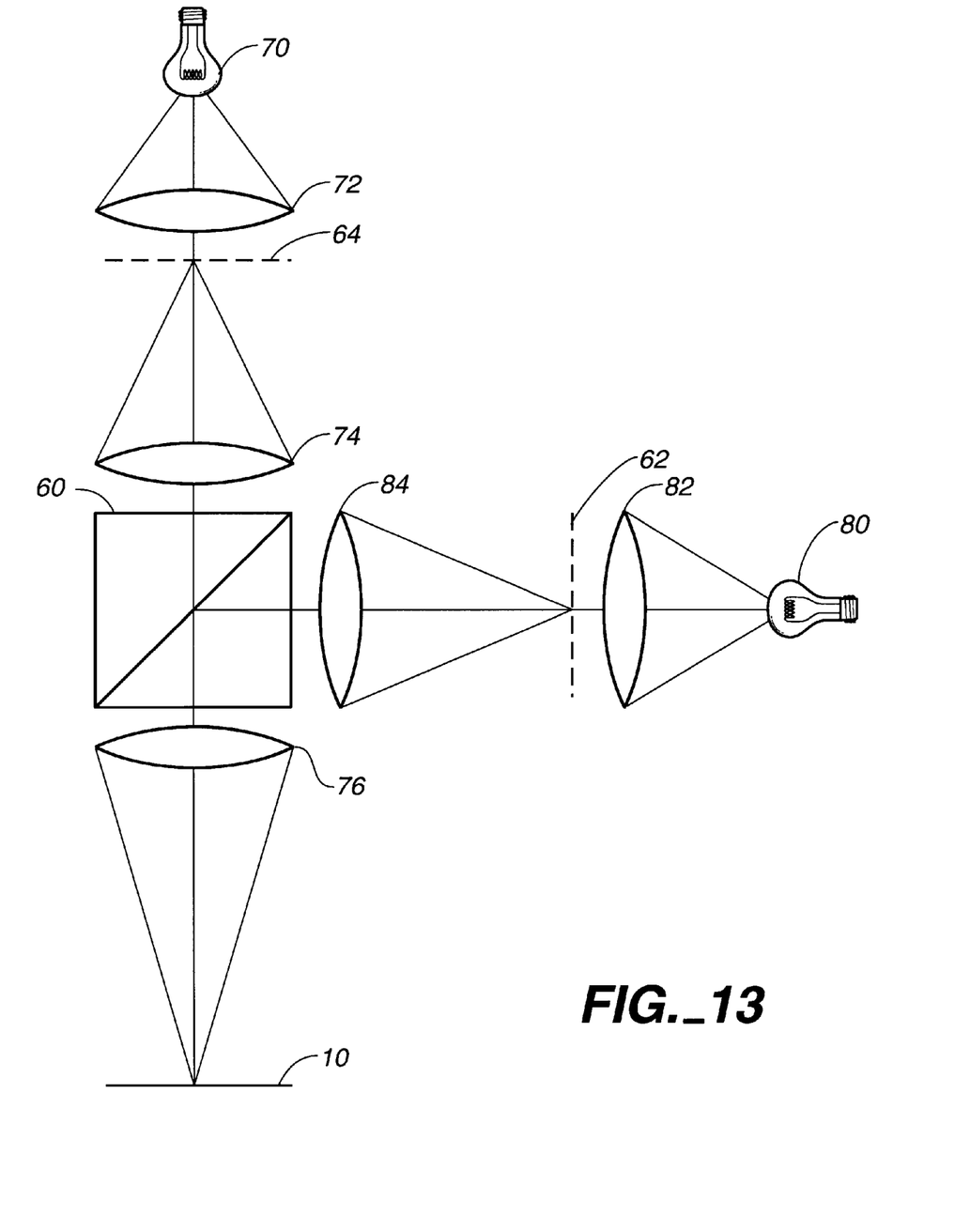
FIG. 13 is a diagrammatic representation of an apparatus used to produce the annular mask of FIG. 9.

Another embodiment, similar to that just described, utilizes a beamsplitter 60 as illustrated diagrammatically in FIG. 13, to combine the apodized aperture pattern with a second spinning mask 62 of any desirable pattern using another projection system branch. In this embodiment, a tapered (i.e., reverse apodized) annular mask pattern is implemented in the second branch of the projection system to produce a masked lens as shown in FIG. 9 having diffraction-reducing edges on the inside of the annular mask and the outside of the annular mask.

Figure 14:
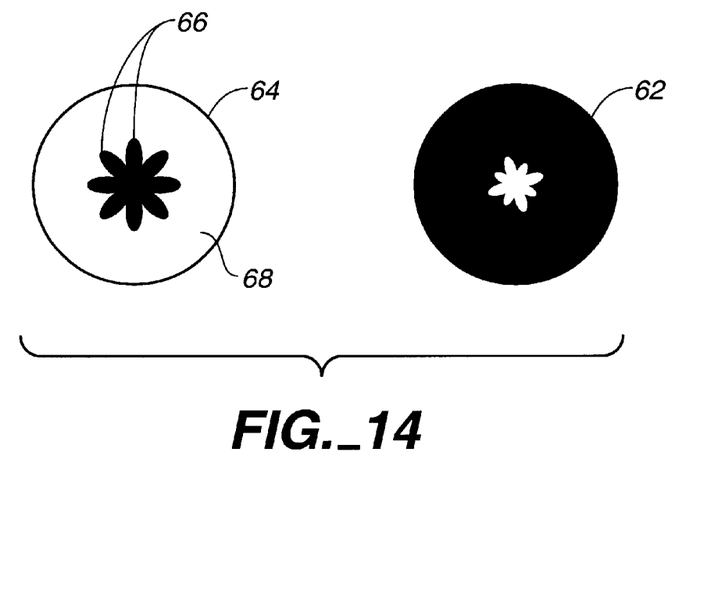
FIG. 14 is a plan view of one embodiment of a set of masks used in the apparatus of FIG. 13.

A mask 64 with a plurality of opaque petals 66 on a light-transmitting substrate disk 68 (FIG. 14) is illuminated by a light source 70 and condenser lens 72 (FIG. 13). A magnified or demagnified image of the mask 64 is formed on the lens 10 by relay and imaging lenses 74, 76. As the mask 64 is spinning about an axis symmetric to the blade pattern, the image of the spinning mask becomes a brightness-tapered pattern with continuous gray tones. The brightness tapered profile of the image is controlled by the design of the shape of the petals. A second mask 62 of any desirable pattern, such as shown in FIG. 14, is illuminated by a second light source 80 and condenser lens 82. A second magnified or demagnified image is formed on the lens 10 by relay and imaging lenses 84, 76 and beamsplitter 60. The final image is a combined image of the individual images superimposed on the lens 10. By controlling the brightness of the light sources and/or exposure time for each mask, a combined image of any desired transmissivity pattern can be produced in the lens.

Figure 15:
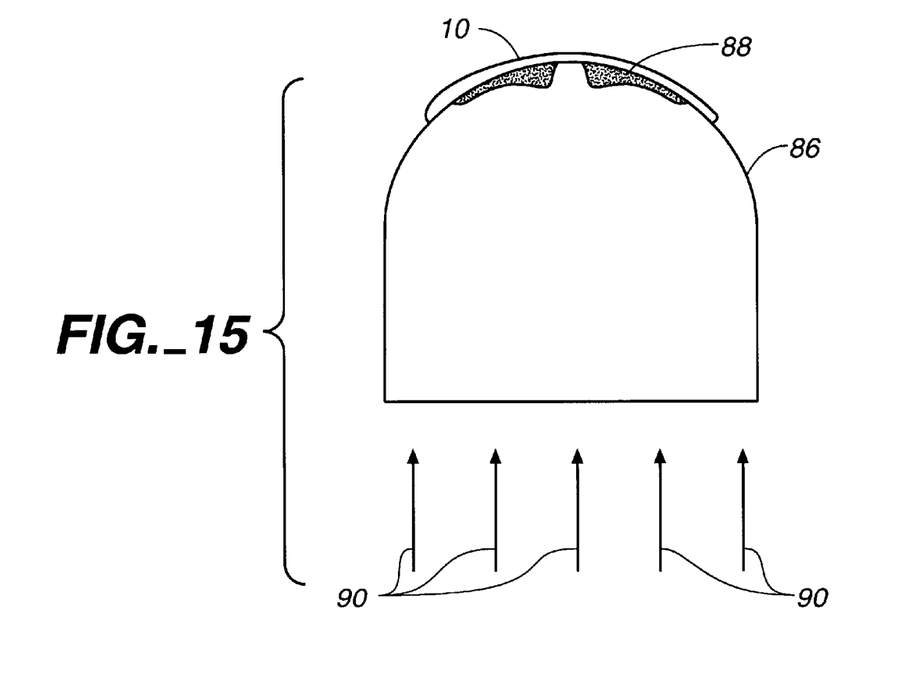
FIG. 15 is an apparatus for use in another method for producing the present invention.

In another embodiment, a transparent dome 86 (FIG. 15) having a light-occluding portion 88 is used to produce the annular mask pattern in the lens. The dome 86 has a groove machined into the top of the dome beginning at a depth of about 0.1 millimeters deep in the region surrounding an area not machined out that will form the central aperture on the lens and rapidly increasing to a depth of about 1.0 millimeters at a diameter of about 1.6 millimeter then gradually decreasing to a depth of 0.1 millimeters at an outside diameter of 5.5 millimeters. The groove is filled with black blocking wax to form light occluding portion 88. In use, the lens 10 is emersed in a Diazo dye solution (HD-61) and then placed on the dome 86 in position so that the light-occluding portion of the dome is in the position where the resulting annular mask should be on the finished lens. Light 90 is shone from beneath the dome until all exposed areas of the lens become discolored. A typical light source is a HA 6000 halogen ELH or ENX lamp. The lens is then placed into phloroglucinol solution in which the areas of the lens corresponding to the light-occluding part of the dome turn black and form a continually variable shade of gray resulting in an annular mask pattern such as shown in FIG. 9.

Figure 16:
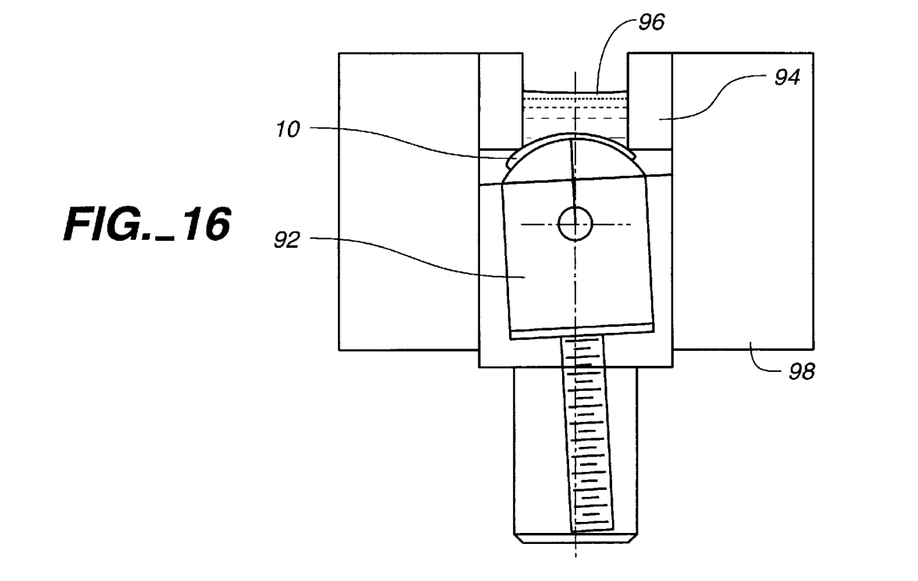
FIGS. 16 and 17 illustrate a further embodiment for producing the present invention.
Figure 17:
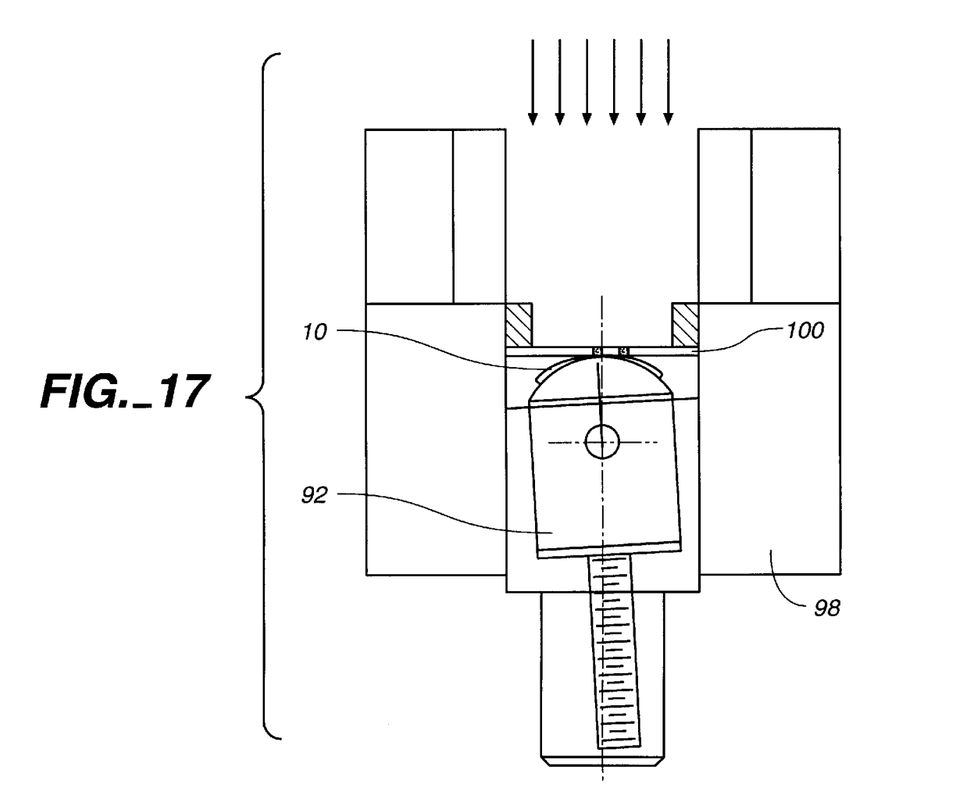

In another embodiment, the lens 10 is positioned correctly on an opaque dome 92 in housing 98, and then contacted with a dam ring 94 to hold dye solution 96 (FIG. 16). Dye solution is placed in the dam ring and allowed to permeate the lens from the top side of the lens only. Dye is allowed to diffuse into the lens only to a depth necessary to produce the desired intensity, and not all the way through the thinnest section of the lens. After the dye has penetrated the lens 10, the dam ring is removed and the dye rinsed off the surface quickly with water. A light restricting mask 100 is then placed over the lens 10 and the dye in the lens is desensitized by exposure to light (FIG. 17). The mask 100 is produced on a computer monitor with a commercially available graphics program. Then either printed out on a clear film or a slide is made with a 35 millimeter camera of the computer-generated mask pattern. The slide film is then used as the mask 100. Alternatively, the mask 100 can be produced by methods such as but not limited to selection of appropriate neutral density or color filters, metal deposition such as sputtering, vacuum deposition, printing, spraying, etc.

In order to achieve a more graduated or tapered edge, the mask can be raised slightly above the lens, so that a diffused edge will form from light diffracting effects. By varying the distance of the mask from the lens, the light intensity, duration of exposure to the light, and quality of light in the lens, different tapering effects may be produced in the lens.

Another practice uses a variably transmissive coating applied to, or manufactured with, the lens body. Yet another practice generates the annular mask with a plurality of light-blocking dots, which in total reduce the transmission of light energy through the annulus to the selected transmissivity. Another practice uses a shutter-like mechanical device (not shown) with several shutter blades arranged to provide masking in three concentric annular regions corresponding to the inner soft edge, the opaque portion and the outer soft edge. The opaque region will be fixed with 1% transmissivity or less. The transmissivity of the inner soft edge and the outer soft edge can be varied with the speed of the shutter blades opening and closing and with the shape of the shutter blades.

Other practices for forming the annular mask include other Diazo contact printing processes, mesoprints, and reactive and VAT dyes. Other practices for forming the annular mask include a variety of methods for disrupting the surface or refractive properties of the lens in the area of the annular mask. For example, lasers or chemical etchants, or physical abrasives, are effectively used to disrupt the optical surface of the contact to change the transmission in the annular mask region to form the annular mask. Suitable techniques for disrupting and creating such optical surfaces are described in U.S. Pat. No. 4,744,647, entitled "Semi-Opaque Corneal Contact Lens or Intraocular Lens and Method of Formation".

Another embodiment for achieving the variably transmissive annular mask utilizes PAD FLEX, or Italio Plate methodology, which is well-known to those skilled in the art. In PAD FLEX printing, for example, a silicone tip contacts an Italio plate engraved with a selectable pattern and filled with ink. The tip acquires the image from the Italio plate and then transfers the image without distortion onto a wide range of curved surfaces, such as a contact lens.

In another method of imparting the annular mask to the contact lens, the mask comprises a pigment suspended in a solvent material which is applied to the surface of a contact lens mold, and the contact lens is cast and polymerized thereabouts. This means that the mask is incorporated into the body of the lens as part of the contact lens surface or into the lens body in the region immediately adjacent to the lens surface. Suitable pigments for use with this method include:

| Color Index | Chemical Name |
| --- | --- |
| Pigment Black 7 | Carbon Black |
| Pigment Black 11 | Iron Oxide |
| Pigment Brown 6 | Iron Oxide |
| Pigment Red 101 | Iron Oxide |
| Pigment Yellow 42 | Iron Oxide |
| Pigment White #6 | Titanium Oxide |
| Pigment Green #17 | Chromic Oxide |
| Pigment Blue #36 | Chromium-Aluminum-Cobaltous Oxide |
| Pigment Green #7 | Poly chloro copper phthalocyanine |
| Pigment Blue #15 | Copper phthalocyanine |
| Pigment Violet #23 | 3, amino-9-ethyl carbazole-chloranil |

Furthermore, the above mentioned pigments may be mixed with one another to produce the desired variably transmissive mask. Likewise, precipitated vat dyes, including precipitated version of those disclosed earlier may be used as suitable pigments in the above method.

In another embodiment for incorporating the variably transmissive mask into the body of the lens, pigment is dispersed in a polymerisable medium which is then applied to the surface of a contact lens casting mold and the contact lens is cast and polymerized thereabouts. In this particular instance as the main body of the lens is polymerized so is the polymerisable medium in which pigment is incorporated into the contact lens as part of the surface of the contact lens or immediately adjacent thereto.

The pigments which may be used with this particular arrangement of the present invention include those disclosed above for use with the earlier disclosed methods, which may be dispersed in the same monomeric materials as that from which the contact lens is formed.

In another embodiment, a rod of polymeric material is formed, which rod has a band of variably transmissive material throughout its length, this rod is then cut into buttons from which the contact lenses are then machined. In its simplest form this method may be used to produce individual buttons and not a rod.

A contact lens constructed in accordance with the invention is colored, tinted, or otherwise shaded, when appropriate, by methods known in the art. This coloring or tinting can be cosmetic, as it often is for many wearers of common contact lenses. It can also reduce the sometimes objectionable appearance of the annular mask 18 when viewed on the eye of the wearer. For example, the invention provides for an annulus that is matched to the wearer's iris. It also provides for an annulus that enhances or changes the appearance of the wearer's iris, if desired. A further enhancement can include a limbal ring as described in U.S. Pat. No. 5,302,978 which is incorporated herein in its entirety.

It will be understood that changes may be made in the above constructions without departing from the scope of the invention. For example, the arrangement and size of the annular mask 18, can be selected for a particular wearer to optimize the visual correction available. In another example, the contact lens body 12 can be constructed with a yellow appearance, giving the wearer a physiological impression of brighter lighting. Those skilled in the art will appreciate that the invention can also aid wearers suffering from other vision deficiencies and disorders.

EXAMPLE 1

A contact lens in accordance with FIG. 9 was produced with the following procedure. A 1% sensitizer solution was formed by dissolving 1.0 grams of 4-diazo-[4'-toluyl]-mercapto-2,5-diethoxybenzene zinc chloride (also referred to as Diazo-15 or HD-61) in 100.0 grams of de-ionized water and sonicating for 15 to 20 minutes. A 1% developer solution was formed by dissolving 1.0 grams of phloroglucinol dihydrate in 100.0 grams of de-ionized water and sonicating for 15–20 minutes. The solutions were filtered using 0.45 micron filter paper prior to use. Prior to tinting, the lens was equilibrated in water for at least 1 hour. The lens was then pat dry and dropped in a vial containing about 6–8 milliliters of sensitizer. The front curve of the lens was uppermost. The lens was left in the solution for 3 minutes. The lens was removed, rinsed with water and pat dry. The lens was positioned on a dome and the imaging mask pattern placed over the lens on the dome. The dome was then placed over a type ENX HA 6000 Halogen light source for 2 minutes. The lens was then removed from the dome and placed in the developer solution for 2 minutes. The lens was then rinsed with clean water and processed via the usual extraction and hydration processes.

The foregoing has described the principles, preferred embodiments and modes of operation of the present invention. However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A lens adapted to be worn on or implanted in the eye, comprising:

a central portion of selected transmissivity such that the central portion transmits more light energy at a center of the central portion and less light energy toward an outer region of the central portion; and an annular mask region surrounding the central portion wherein the annular mask region adjacent to the outer region of the central portion has a transmissivity below which the annular mask region functions as essentially opaque, remains at that amount of transmissivity or less for a distance in the range of about 0.5 millimeters to about 4.0 millimeters, then increases in transmissivity until reaching an outer edge of the annular mask region of the lens.

2. A lens adapted to be worn on or implanted in the eye, comprising:

a central portion of selected transmissivity such that the central portion transmits more light energy at a center of the central portion and less light energy toward an outer region of the central portion; and an annular mask region surrounding the central portion wherein the annular mask region adjacent to the outer region of the central portion has a transmissivity below which the annular mask region functions as essentially opaque, remains at that amount of transmissivity or less for a distance in the range of about 1.5 millimeters to about 2.0 millimeters, then increases in transmissivity until reaching an outer edge of the annular mask region or the lens.

3. A lens adapted to be worn on or implanted in the eye, comprising:

a clear aperture;

an annular portion adjacent to the clear aperture which transmits more light energy at an inner region and less light energy toward an outer region; and an annular mask region adjacent to the outer region of the annular portion, wherein a part of the annular portion adjacent to the clear aperture provides about 100% transmissivity and wherein the annular portion decreases from about the 100% transmissivity and transitions to the annular mask region and a transmissivity below which the annular mask region functions as essentially opaque, the annular mask region remains at that amount of transmissivity or less for a distance in the range of about 0.5 millimeters to about 4.0 millimeters, then the annular mask region increases in transmissivity until reaching an outer edge of the annular mask region of the lens.

4. A lens adapted to be worn on or implanted in the eye, comprising:

a clear aperture;

an annular portion adjacent to the clear aperture which transmits more light energy at an inner region and less light energy toward an outer region; and an annular mask region adjacent to the outer region of the annular portion, wherein a part of the annular portion adjacent to the clear aperture provides about 100% transmissivity and wherein the annular portion decreases from about 100% transmissivity and transitions to the annular mask region and a transmissivity below which the annular mask region functions as essentially opaque, the annular mask region remains at that amount of transmissivity or less for a distance in the range of about 1.5 millimeters to about 2.0 millimeters, then the annular mask region increases in transmissivity until reaching an outer edge of the annular mask region of the lens.

* * * * *